US012353078B2

(12) United States Patent
Li et al.

(10) Patent No.: US 12,353,078 B2
(45) Date of Patent: Jul. 8, 2025

(54) DISPLAY MODULE

(71) Applicants: InnoLux Corporation, Miao-Li County (TW); CARUX TECHNOLOGY PTE. LTD., Singapore (SG)

(72) Inventors: Jyun-Sian Li, Miao-Li County (TW); Hong-Sheng Hsieh, Miao-Li County (TW); Li-Wei Sung, Tainan (TW)

(73) Assignees: INNOLUX CORPORATION, Miao-Li County (TW); CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/827,626

(22) Filed: Sep. 6, 2024

(65) Prior Publication Data

US 2025/0123508 A1    Apr. 17, 2025

(30) Foreign Application Priority Data

Oct. 11, 2023   (CN) .......................... 202311313722.8

(51) Int. Cl.
*G02F 1/13*       (2006.01)
*G02F 1/1333*     (2006.01)
*G02F 1/1343*     (2006.01)

(52) U.S. Cl.
CPC ...... *G02F 1/1323* (2013.01); *G02F 1/133374* (2021.01); *G02F 1/133388* (2021.01); *G02F 1/13439* (2013.01)

(58) Field of Classification Search
CPC ......... G02F 1/133374; G02F 1/133388; G02F 1/13439; G02F 1/1323

USPC .......................................................... 349/56
See application file for complete search history.

(56) References Cited

U.S. PATENT DOCUMENTS

| 10,768,355 | B2  |    | 9/2020  | Klippstein |                     |
|------------|-----|----|---------|------------|---------------------|
| 2008/0007684 | A1 | *  | 1/2008  | Kim        | G02F 1/134363       |
|            |     |    |         |            | 349/143             |
| 2017/0166813 | A1 | *  | 6/2017  | Xie        | C09K 19/0275        |
| 2018/0314075 | A1 | *  | 11/2018 | Zhang      | G02F 1/134309       |
| 2022/0269115 | A1 | *  | 8/2022  | Chen       | G02F 1/132          |
| 2023/0375159 | A1 | *  | 11/2023 | Kurokawa   | G02F 1/134309       |

FOREIGN PATENT DOCUMENTS

KR         10-1141944 B1       5/2012

\* cited by examiner

*Primary Examiner* — Christopher M Raabe
(74) *Attorney, Agent, or Firm* — McClure, Qualey & Rodack, LLP

(57) ABSTRACT

A display module is provided, which includes a display device, a first viewing-angle control device and a second viewing-angle control device. The first viewing-angle control device includes a first substrate, a second substrate, a first liquid-crystal layer and a first transparent conductive layer. The first transparent conductive layer is disposed between the first substrate and the second substrate and includes a first portion. The second viewing-angle control device includes a third substrate, a fourth substrate, a second liquid-crystal layer and a second transparent conductive layer. The second transparent conductive layer is disposed between the third substrate and the fourth substrate and includes a second portion, and the second portion overlaps the first portion. In a cross-sectional view, a side of the first portion of the first transparent conductive layer is separated from a side of the second portion of the second transparent conductive layer by a first distance.

20 Claims, 10 Drawing Sheets

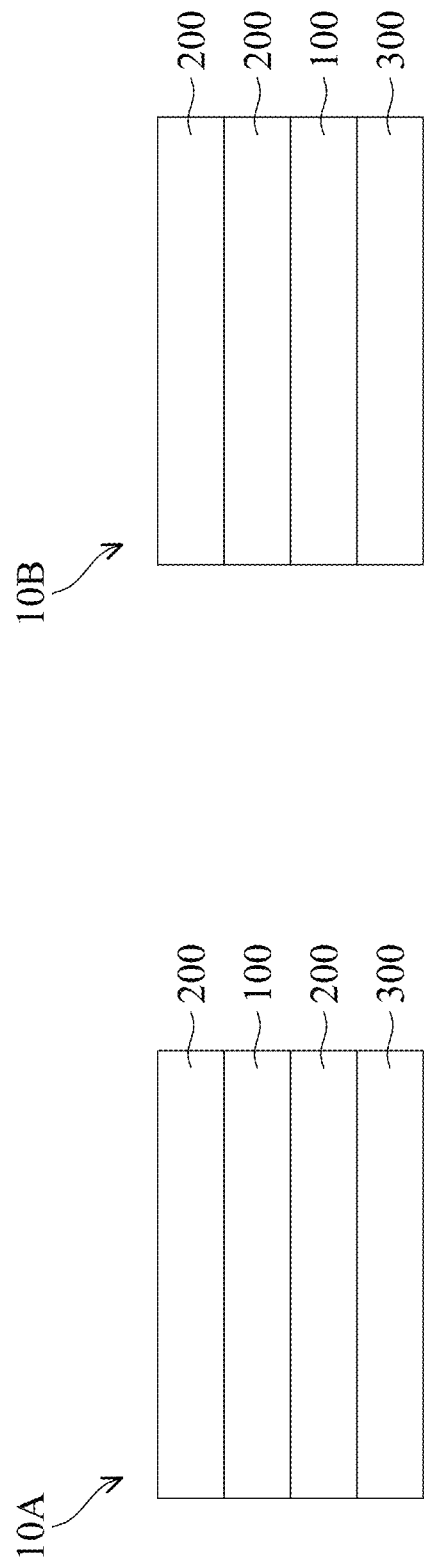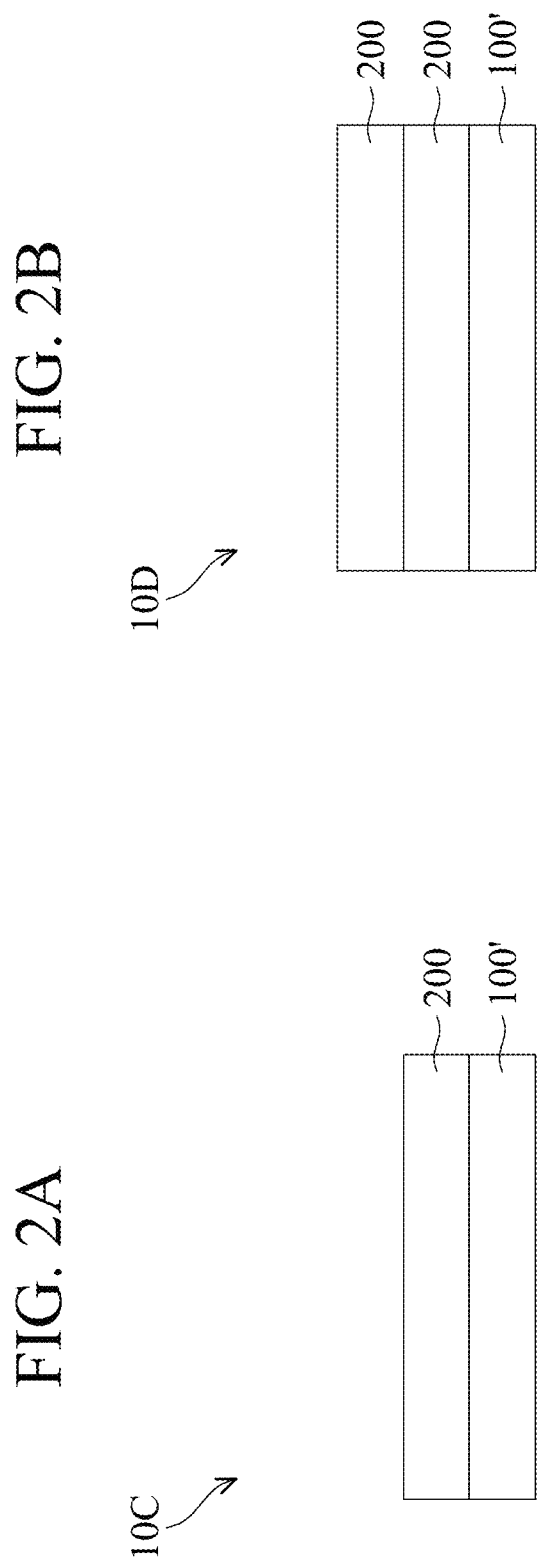

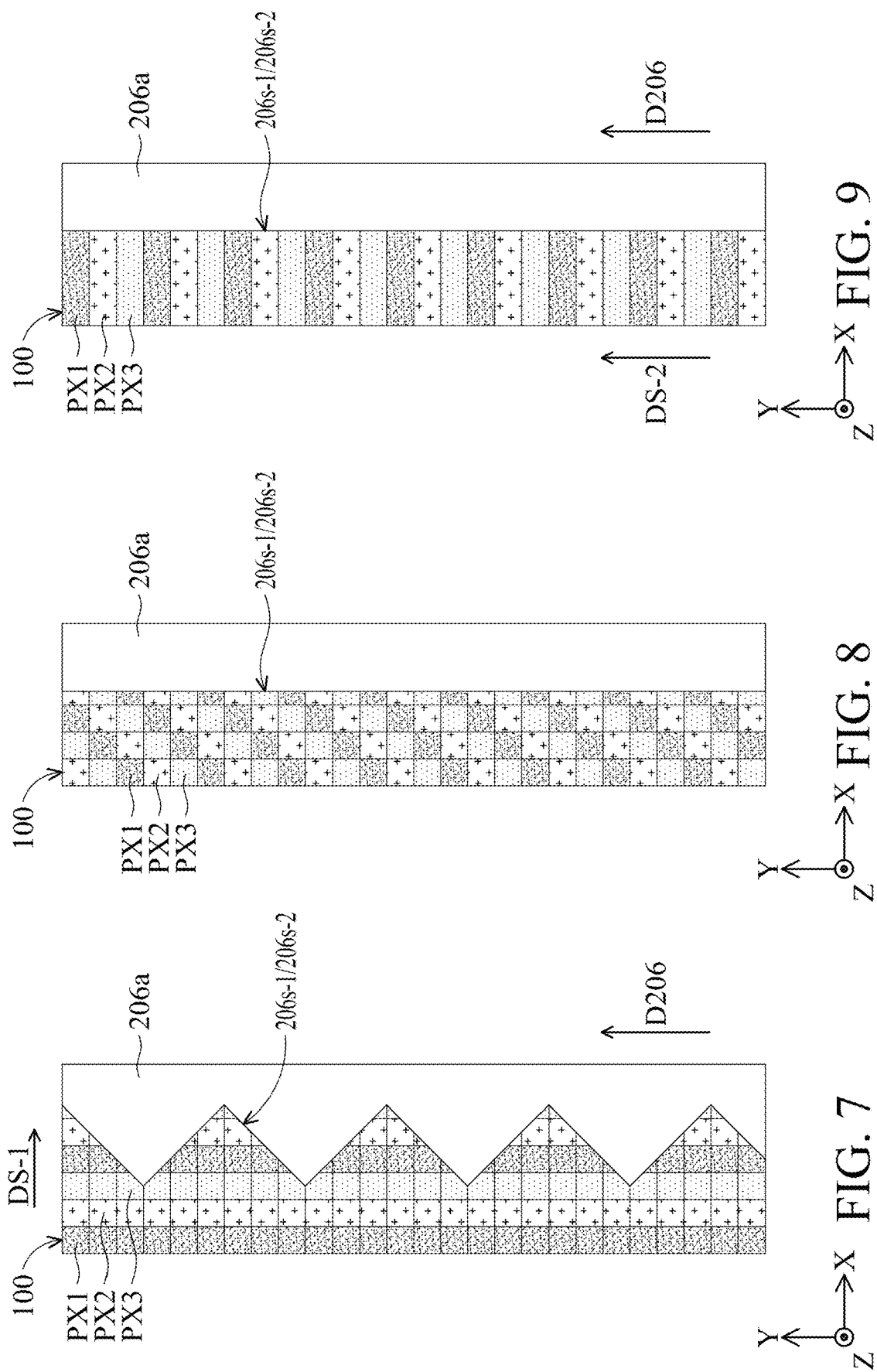

DISPLAY MODULE

CROSS REFERENCE TO RELATED APPLICATIONS

This application claims the benefit of China Application No. 202311313722.8, filed Oct. 11, 2023, the entirety of which is incorporated by reference herein.

BACKGROUND

Technical Field

The present disclosure is related to a display module, and in particular it is related to a display module having a viewing-angle control device.

Description of the Related Art

Electronic devices including display panels, such as tablet computers, notebook computers, smartphones, monitors and televisions, have become indispensable necessities in modern society. With the ongoing development in these portable electronics, consumers have high expectations regarding the quality, functionality or price of these products.

Car audio and video systems are becoming increasingly rich in functionality. Based on safety considerations, the display system for the passenger seat needs to have an anti-peep function (a privacy function) when the vehicle is in operation, so that it does not become a distraction to the driver. When the vehicle is not in motion, the display system may need to share information with the driver, requiring a shared display function. This active anti-peep design can meet both needs.

However, the junction between the privacy display area and the shared display area is prone to produce abrupt visual effects due to obvious changes in light and dark, affecting visual taste, and is prone to image ghosting from side viewing angles. Therefore, developing display modules that can further improve display quality and performance is still one of the current research topics in the industry.

SUMMARY

In accordance with some embodiments of the present disclosure, a display module is provided. The display module includes a display device, a first viewing-angle control device and a second viewing-angle control device. The first viewing-angle control device is adjacent to the display device. The second viewing-angle control device is disposed on the first viewing-angle control device. The first viewing-angle control device includes a first substrate, a second substrate, a first liquid-crystal layer and a first transparent conductive layer. The first liquid-crystal layer is disposed between the first substrate and the second substrate. The first transparent conductive layer is disposed between the first substrate and the second substrate and includes a first portion. The second viewing-angle control device includes a third substrate, a fourth substrate, a second liquid-crystal layer and a second transparent conductive layer. The second liquid-crystal layer is disposed between the third substrate and the fourth substrate. The second transparent conductive layer is disposed between the third substrate and the fourth substrate and includes a second portion, and the second portion overlaps the first portion. In a cross-sectional view, a side of the first portion of the first transparent conductive layer is separated from a side of the second portion of the second transparent conductive layer by a first distance.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein:

FIGS. 2A to 2D are schematic diagrams of a display module in accordance with some embodiments of the present disclosure;

FIGS. 7 to 11 are schematic diagrams of some components in a display module in accordance with some embodiments of the present disclosure;

DETAILED DESCRIPTION

Figure 1:
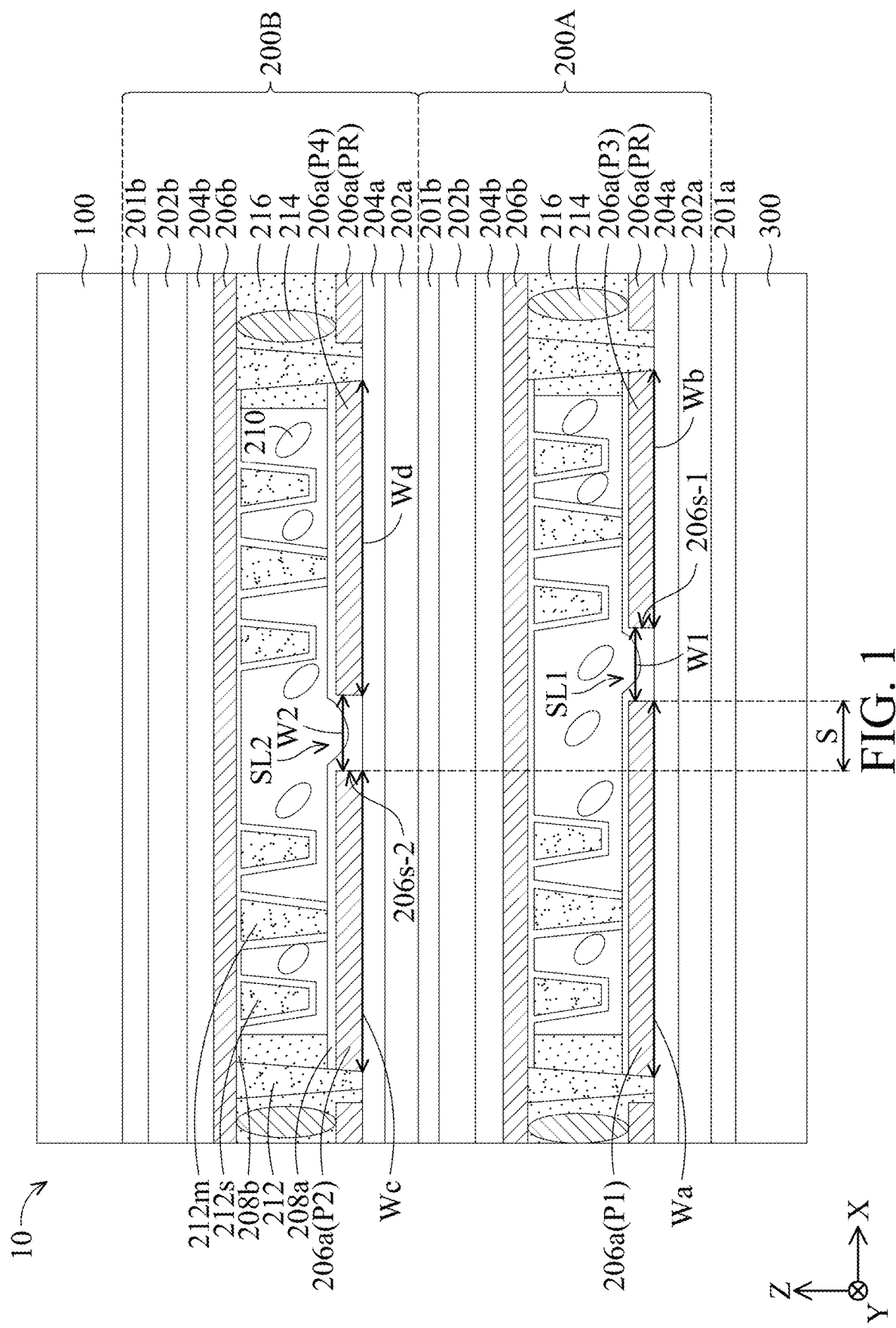
FIG. 1 is a cross-sectional diagram of a display module in accordance with some embodiments of the present disclosure.

The display module according to the present disclosure are described in detail in the following description. It should be understood that in the following detailed description, for purposes of explanation, numerous specific details and embodiments are set forth in order to provide a thorough understanding of the present disclosure. The elements and configurations described in the following detailed description are set forth in order to clearly describe the present disclosure. These embodiments are used merely for the purpose of illustration, and the present disclosure is not limited thereto. In addition, different embodiments may use like and/or corresponding numerals to denote like and/or corresponding elements in order to clearly describe the present disclosure. However, the use of like and/or corresponding numerals of different embodiments does not suggest any correlation between different embodiments.

It should be understood that relative expressions may be used in the embodiments. For example, "lower", "bottom", "higher" or "top" are used to describe the position of one element relative to another. It should be appreciated that if a device is flipped upside down, an element that is "lower" will become an element that is "higher". The present disclosure can be understood by referring to the following detailed description in connection with the accompanying drawings. The drawings are also regarded as part of the description of the present disclosure. It should be understood that the drawings of the present disclosure may be not drawn to scale. In fact, the size of the elements may be arbitrarily enlarged or reduced to clearly represent the features of the present disclosure.

Furthermore, the expression "a first material layer is disposed on or over a second material layer" may indicate that the first material layer is in direct contact with the second material layer, or it may indicate that the first material layer is in indirect contact with the second material layer. In the situation where the first material layer is in indirect contact with the second material layer, there may be one or more intermediate layers between the first material layer and the second material layer. However, the expression "the first material layer is directly disposed on or over the second material layer" means that the first material layer is in direct contact with the second material layer, and there is no intermediate element or layer between the first material layer and the second material layer.

Moreover, it should be understood that the ordinal numbers used in the specification and claims, such as the terms "first", "second", etc., are used to modify an element, which itself does not mean and represent that the element (or elements) has any previous ordinal number, and does not mean the order of a certain element and another element, or the order in the manufacturing method. The use of these ordinal numbers is to make an element with a certain name can be clearly distinguished from another element with the same name. Claims and the specification may not use the same terms. For example, the first element in the specification may refer to the second element in the claims.

In accordance with the embodiments of the present disclosure, regarding the terms such as "connected to", "interconnected with", etc. referring to bonding and connection, unless specifically defined, these terms mean that two structures are in direct contact or two structures are not in direct contact, and other structures are provided to be disposed between the two structures. The terms for bonding and connecting may also include the case where both structures are movable or both structures are fixed. In addition, the term "electrically connected to" or "coupled to" may include any direct or indirect electrical connection means.

In the following descriptions, terms "about", "substantially" and "approximately" typically mean +/−10% of the stated value, or typically +/−5% of the stated value, or typically +/−3% of the stated value, or typically +/−2% of the stated value, or typically +/−1% of the stated value or typically +/−0.5% of the stated value. The expression "in a range from the first value to the second value" or "between the first value and the second value" means that the range includes the first value, the second value, and other values in between. Moreover, certain errors may exist between any two values or directions used for comparison. If the first value is equal to the second value, it implies that there may be an error of about 10% between the first value and the second value; if the first direction is perpendicular to the second direction, the angle between the first direction and the second direction may be between 80 degrees and 100 degrees; if the first direction is parallel to the second direction, the angle between the first direction and the second direction may be between 0 degrees and 10 degrees.

Furthermore, it should be understood that, in accordance with the embodiments of the present disclosure, a scanning electron microscope (SEM), an optical microscope (OM), a film thickness profiler (α-step), an ellipsometer or another suitable method may be used to measure the thickness, length or width of each element, or distance or angle between elements. Specifically, in accordance with some embodiments, a scanning electron microscope may be used to obtain a cross-sectional image including the elements to be measured, and the thickness, length or width of each element, or distance or angle between elements in the image can be measured.

It should be understood that in the following embodiments, without departing from the spirit of the present disclosure, the features in several different embodiments can be replaced, recombined, and mixed to complete another embodiment. The features between the various embodiments can be mixed and matched arbitrarily as long as they do not violate or conflict the spirit of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the present disclosure, a display module is provided, including the display device and viewing-angle control devices that are configured in a specific manner, which can be zone-controlled to display the same or different modes (for example, a privacy mode and a share mode). In this way, the borderless requirement can be achieved, and the discontinuity of the images at the junction of areas of different display modes can be reduced. Therefore, the visual taste can be improved, and the ghosting caused by side viewing angles can be reduced.

Please refer to FIG. 1, which is a cross-sectional diagram of a display module 10 in accordance with some embodiments of the present disclosure. It should be understood that, for clear explanation, some components of the display module 10 may be omitted in the drawings, and only some components are schematically illustrated. In accordance with some embodiments, additional features may be added to the display module 10 described below. In addition, it should be understood that, in order to make the drawings clear and concise, the component symbols of some identical components are only labeled in the second viewing-angle control device 200B and are omitted in the first viewing-angle control device 200A.

As shown in FIG. 1, the display module 10 may include a display device 100, a first viewing-angle control device 200A and a second viewing-angle control device 200B. The first viewing-angle control device 200A may be adjacent to the display device 100, and the second viewing-angle control device 200B may be disposed on the first viewing-angle control device 200A. Furthermore, the display module 10 may further include a backlight device 300 adjacent to the first viewing-angle control device 200A. In accordance with some embodiments, the display module 10 may be a vehicle display module, but it is not limited thereto.

The first viewing-angle control device 200A and the second viewing-angle control device 200B can be used to adjust the light emission angle of the display module 10, so that the display module 10 can present a privacy mode and/or a share mode. In accordance with some embodiments, the first viewing-angle control device 200A may include a substrate 202a, a substrate 202b, a liquid-crystal layer 210 and a transparent conductive layer 206a. Similarly, in accordance with some embodiments, the second viewing-angle control device 200B may include a substrate 202a, a substrate 202b, a liquid-crystal layer 210, and a transparent conductive layer 206a.

In accordance with some embodiments, the materials of the substrate 202a and the substrate 202b may include glass, quartz, sapphire, ceramics, polyimide (PI), polycarbonate (PC), polyethylene terephthalate (PET), polypropylene (PP), another suitable material or a combination thereof, but they are not limited thereto. Furthermore, the material of the substrate 202a may be the same as or different from the material of the substrate 202b.

The liquid-crystal layer 210 may be disposed between the substrate 202a and the substrate 202b. In accordance with some embodiments, the liquid-crystal layer 210 may include nematic liquid-crystal, smectic liquid-crystal, cholesteric liquid-crystal, blue-phase liquid-crystal, another suitable liquid crystal material, or a combination thereof, but it is not limited thereto.

The transparent conductive layer 206a may be disposed between the substrate 202a and the substrate 202b. For example, the transparent conductive layer 206a may be disposed on the substrate 202a. The transparent conductive layer 206a of the first viewing-angle control device 200A may include a portion P1, and the transparent conductive layer 206a of the second viewing-angle control device 200B may include a portion P2. In a cross-sectional view, a side 206s-1 of the portion P1 of the transparent conductive layer 206a of the first viewing-angle control device 200A is separated from a side 206s-2 of the portion P2 of the transparent conductive layer 206a of the second viewing-angle control device 200B by a distance S. In accordance with some embodiments, the distance S may be between 1 millimeter (mm) to 50 mm (1 mm≤distance S≤50 mm), or between 5 mm and 45 mm, such as 10 mm, 15 mm, 20 mm, 25 mm, 30 mm, 35 mm or 40 mm.

In accordance with some embodiments, the aforementioned distance S refers to the maximum distance between the side 206s-1 and the side 206s-2 of the transparent conductive layer 206a in a direction perpendicular to the normal direction of the substrate 202a or the substrate 202b (for example, the X direction in the drawing).

It should be noted that the transparent conductive layers 206a of the first viewing-angle control device 200A and the second viewing-angle control device 200B can be offset so that the side 206s-1 and the side 206s-2 are separated by a distance S, thereby allowing the boundaries between different display areas of the display module 10 (for example, the shared display area and the privacy display area) being blurred to improve the sense of discontinuity of images at the in the junctions.

As described above, the transparent conductive layers 206a of the first viewing-angle control device 200A and the second viewing-angle control device 200B may include the portion P1 and the portion P2 respectively. Specifically, in accordance with some embodiments, the transparent conductive layer 206a of the first viewing-angle control device 200A may be patterned to have the portion P1, a portion P3 adjacent to the portion P1, and a first slit SL1 between the portion P1 and the portion P3; and the transparent conductive layer 206a of the second viewing-angle control device 200B may be patterned to have the portion P2, a portion P4 adjacent to the portion P2, and a second slit SL2 between the portion P2 and the portion P4. Moreover, in a top view, the first slit SL1 and the second slit SL2 do not overlap. For example, in the normal direction of the substrate 202a or the substrate 202b (for example, the Z direction in the drawing), the first slit SL1 and the second slit SL2 do not overlap. Furthermore, the portion P2 may partially overlap the portion P1, and the portion P4 may partially overlap the portion P3. In accordance with some embodiments, a width W1 of the first slit SL1 may be between 4 micrometers (μm) and 10 μm (4 μm≤width W1≤10 μm), for example, 5 μm, 6 μm, 7 μm, 8 μm or 9 μm. In accordance with some embodiments, a width W2 of the second slit SL2 may be between 4 μm and 10 μm (4 μm≤width W2≤10 μm), for example, 5 μm, 6 μm, 7 μm, 8 μm, or 9 μm.

In accordance with some embodiments, the aforementioned width W1 refers to the maximum width of the first slit SL1 in a direction perpendicular to the normal direction of the substrate 202a or the substrate 202b (for example, the X direction in the drawing). In accordance with some embodiments, the aforementioned width W2 refers to the maximum width of the second slit SL2 in a direction perpendicular to the normal direction of the substrate 202a or the substrate 202b.

Furthermore, the portion P1 and the portion P3 of the transparent conductive layer 206a of the first viewing-angle control device 200A may have a width Wa and a width Wb respectively, and the portion P2 and the portion P4 of the transparent conductive layer 206a of the second viewing-angle control device 200B may have a width Wc and a width Wd. In accordance with some embodiments, the width Wa of the portion P1 may be greater than the width Wc of the portion P2 (width Wa>width Wc). In accordance with some embodiments, the width Wb of the portion P3 may be smaller than the width Wd of the portion P4 (width Wb<width Wd).

In accordance with some embodiments, the aforementioned width Wa, width Wb, width Wc and width Wd respectively refer to the maximum widths of the portion P1, the portion P3, the portion P2, and the portion P4 in a direction perpendicular to the normal direction of the substrate 202a or the substrate 202b (for example, the X direction in the drawing).

In addition, as shown in FIG. 1, in accordance with some embodiments, the transparent conductive layer 206a may further include a portion PR, and the portion PR of the transparent conductive layer 206a may be disposed outside the spacer element 212, for example, may be disposed in the peripheral areas (not illustrated) of the first viewing-angle control device 200A and the second viewing-angle control device 200B. In accordance with some embodiments, the portion PR of the transparent conductive layer 206a may be further electrically connected to the structures such as an external printed circuit board (PCB), chip on film (COF), or chip on glass (COG), but it is not limited thereto.

The material of the transparent conductive layer 206a may include transparent conductive oxide (TCO). For example, in accordance with some embodiments, the material of the transparent conductive layer 206a may include indium tin oxide (ITO), antimony zinc oxide (AZO), tin oxide (SnO), zinc oxide (ZnO), indium zinc oxide (IZO), indium gallium zinc oxide (IGZO), indium tin zinc oxide (ITZO), antimony tin oxide, ATO), another suitable transparent conductive material, or a combination thereof, but it is not limited thereto.

In addition, in accordance with some embodiments, the first viewing-angle control device 200A and the second viewing-angle control device 200B may further include a polarizing layer 201a, a polarizing layer 201b, an insulating layer 204a, an insulating layer 204b, a transparent conductive layer 206b, an alignment layer 208a, an alignment layer 208b, a spacer element 212, a spacer element 212m, a spacer element 212s, a conductive element 214 and a sealing element 216.

The polarizing layer 201a and the polarizing layer 201b may be disposed on the outer surfaces of the substrate 202a and the substrate 202b respectively. Specifically, the polarizing layer 201a of the first viewing-angle control device 200A may be disposed between the backlight device 300 and the substrate 202a. The polarizing layer 201b of the first viewing-angle control device 200A may be disposed between the substrate 202b of the first viewing-angle control device 200A and the substrate 202a of the second viewing-angle control device 200B. The polarizing layer 201b of the second viewing-angle control device 200B may be disposed between the display device 100 and the substrate 202b.

In accordance with some embodiments, the polarizing layer 201a and the polarizing layer 201b may include a polyvinyl alcohol (PVA) film. Furthermore, the polarizing layer 201a and the polarizing layer 201b may have a single-layer or multi-layer structure. In accordance with some embodiments, the polarizing layer 201a may further include a protective layer disposed between the polyvinyl alcohol film and the substrate 202a. In accordance with some other embodiments, the polarizing layer 201b may further include a protective layer disposed between the polyvinyl alcohol film and the substrate 202b. In accordance with still some other embodiments, the polarizing layer 201a may further include a protective layer disposed between the polyvinyl alcohol film and the substrate 202a, and the polarizing layer 201b may further include a protective layer disposed between the polyvinyl alcohol film and the substrate 202b. For example, the material of the protective layer may include cyclo olefin polymer (COP), but it is not limited thereto.

It should be understood that, in accordance with some embodiments, the first viewing-angle control device 200A and the second viewing-angle control device 200B may have substantially the same structure, and may share the polarizing layer 201b disposed between the two substrates 202a and 202b (as shown in FIG. 1, the polarizing layer 201b of the first viewing-angle control device 200A can be used by the second viewing-angle control device 200B). However, in accordance with some other embodiments, the second viewing-angle control device 200B may further include a polarizing layer (not illustrated) disposed between the substrate 202a and the polarizing layer 201b of the first viewing-angle control device 200A. In addition, in accordance with still some other embodiments, the backlight module 300 may have a reflective brightness enhancement film (DBEF) disposed on the top surface, so the first viewing-angle control device 200A may omit the polarizing layer 201a adjacent to the backlight module 300.

The insulating layer 204a may be disposed between the substrate 202a and the transparent conductive layer 206a, and the insulating layer 204b may be disposed between the substrate 202b and the transparent conductive layer 206b.

The insulating layer 204a and the insulating layer 204b may include an inorganic material, an organic material, or a combination thereof, but it is not limited thereto. In accordance with some embodiments, the inorganic material may include silicon nitride, silicon oxide, silicon oxynitride, aluminum oxide, another suitable material, or s combination thereof, but it is not limited thereto. In accordance with some embodiments, the organic material may include, for example, perfluoroalkoxy alkane (PFA), polytetrafluoroethylene (PTFE), perfluorinated ethylene propylene (FEP), poly ethylene, another suitable material or a combination thereof, but it is not limited thereto. Furthermore, the insulating layer 204a and the insulating layer 204b may have a single-layer or multi-layer structure. The material of the insulating layer 204a may be the same as or different from the material of the insulating layer 204b.

The transparent conductive layer 206a may be disposed between the insulating layer 204a and the alignment layer 208a, and the transparent conductive layer 206b may be disposed between the insulating layer 204b and the alignment layer 208b. As described above, the transparent conductive layer 206a may be patterned to have a plurality of portions. In accordance with some embodiments, the transparent conductive layer 206b may be unpatterned, and the transparent conductive layer 206b may overlap the first slit SL1 or the second slit SL2. In accordance with some embodiments, an electric field can be applied to the liquid-crystal layer 210 through the transparent conductive layer 206a and the transparent conductive layer 206b to change the arrangement direction and angle of the liquid-crystal molecules, thereby adjusting the displayed image.

The material of the transparent conductive layer 206b can be the same as or similar to the material of the aforementioned transparent conductive layer 206a, and thus it will not be repeated here.

The alignment layer 208a may be disposed between the liquid-crystal layer 210 and the transparent conductive layer 206a, and the alignment layer 208b may be disposed between the liquid-crystal layer 210 and the transparent conductive layer 206b. In accordance with some embodiments, the alignment layer 208a may be disposed on the transparent conductive layer 206a and in the first slit SL1. Furthermore, the top surface of the alignment layer 208a disposed in the first slit SL1 may be concave, but it is not limited thereto. In accordance with some embodiments, the alignment layer 208b may further cover the spacer element 212m and the spacer element 212s. In accordance with some other embodiments, the alignment layer 208b may be in contact with a portion of the spacer element 212, but it is not limited thereto.

Furthermore, the spacer element 212 may be disposed between the insulating layer 204a and the transparent conductive layer 206b, and the spacer element 212m and the spacer element 212s may be disposed between the transparent conductive layer 206a and the transparent conductive layer 206b. The spacer element 212, the spacer element 212m and the spacer element 212s can maintain a cell gap between the substrate 202a and the substrate 202b and/or enhance the structural strength of the first viewing-angle control device 200A and the second viewing-angle control device 200B. In accordance with some embodiments, the spacer element 212 may be in contact with the sealing element 216. In accordance with some embodiments, the spacer element 212m may serve as the primary spacer element, the spacer element 212s may serve as the secondary spacer element, and the height of the spacer element 212m may be greater than the height of the spacer element 212s. In accordance with some embodiments, the height of the spacer element 212 may be greater than the heights of the spacer element 212m and the spacer element 212, but it is not limited thereto.

In accordance with some embodiments, the materials of the spacer element 212, the spacer element 212m, and the spacer element 212s may include an organic material. In accordance with some embodiments, the aforementioned organic material may include epoxy resin, acrylic resin such as polymethyl methacrylate (PMMA), benzocyclobutene (BCB), polyethylene terephthalate (PET), polyethylene (PE), polyethersulfone (PES), polycarbonate (PC), another suitable material, or a combination thereof, but it is not limited thereto.

The conductive element 214 may be disposed between the portion PR of the transparent conductive layer 206a and the transparent conductive layer 206b to electrically connect the portion PR with the transparent conductive layer 206b. In accordance with some embodiments, the conductive element 214 may be disposed in the peripheral area (not labeled) of the first viewing-angle control device 200A and the second viewing-angle control device 200B. In addition, in accordance with some embodiments, the first viewing-angle control device 200A may further include metal wirings (not illustrated) in the peripheral area (not labeled). In a direction perpendicular to the display module 10 (for example, the Z direction), the metal wirings may overlap portions (e.g., the portions PR) of the transparent conductive layer 206a to increase the conductivity of portions (the portions PR) of the transparent conductive layer 206a. In accordance with some embodiments, metal wirings may increase conductivity by contacting portions (e.g., the portions PR) of transparent conductive layer 206a. In accordance with other embodiments, the metal wirings may be disposed between the substrate 202 and portions (e.g., the portions PR) of the transparent conductive layer 206a, or may be disposed between the insulating layer 204a and portions (e.g., the portions PR) of the transparent conductive layer 206a, but it is not limited thereto.

In accordance with some embodiments, the conductive element 214 may include a metal material, such as gold (Au), copper (Cu), titanium (Ti), silver (Ag), tin (Sn), aluminum (Al), molybdenum (Mo), tungsten (W), chromium (Cr), nickel (Ni), platinum (Pt), palladium (Pd), alloys of the aforementioned metals, another suitable conductive material, or a combination thereof, but it is not limited thereto.

The sealing element 216 may be disposed between the alignment layer 208a and the alignment layer 208b, and between the transparent conductive layer 206a and the transparent conductive layer 206b. In accordance with some embodiments, the sealing element 216 can serve as a sealant and can be filled around the conductive element 214 and the spacer element 212. Furthermore, in accordance with some embodiments, the sealing element 216 can be used to define the viewing-angle adjustment area (not labeled) and the peripheral area (not labeled) of the first viewing-angle control device 200A and the second viewing-angle control device 200B.

In accordance with some embodiments, the material of the sealing element 216 may include a material with an adhesive function. In accordance with some embodiments, the material of the sealing element 216 may include photo-curing glue, thermal-curing glue, photo-thermal curing glue, another suitable material, or a combination thereof, but it is not limited thereto. For example, in accordance with some embodiments, the sealing element 216 may include optical clear adhesive (OCA), optical clear resin (OCR), pressure sensitive adhesive (PSA), another suitable material, or a combination thereof, but it is not limited thereto.

Based on the foregoing, in the embodiment shown in FIG. 1, the display module 10 has two viewing-angle control devices 200 (the first viewing-angle control device 200A and the second viewing-angle control device 200B), and the first viewing-angle control device 200A and the second viewing-angle control device 200B are disposed between the display device 100 and the backlight module 300. However, in accordance with some other embodiments, the display module 10 may have other stacking structures. For example, please refer to FIGS. 2A to 2D, which are schematic diagrams of the display module in accordance with some other embodiments of the present disclosure.

As shown in FIG. 2A, in accordance with some embodiments, a display module 10A includes two viewing-angle control devices 200. The display device 100 is disposed between the two viewing-angle control devices 200, and one of the viewing-angle control devices 200 is disposed between the display device 100 and the backlight module 300.

As shown in FIG. 2B, in accordance with some embodiments, a display module 10B includes two adjacent viewing-angle control devices 200, and the display device 100 is disposed between the viewing-angle control device 200 and the backlight module 300.

As shown in FIG. 2C, in accordance with some embodiments, a display module 10C includes a viewing-angle control device 200 and a display device 100' adjacent to the viewing-angle control device 200. In this embodiment, the display module 10C may not have a backlight module 300, and the display device 100' may be a self-luminous display device. The self-luminous display device may include, for example, a light-emitting diode (LED) display device. Furthermore, the light-emitting diode may include, for example, an organic light-emitting diode (OLED), a mini light-emitting diode (mini LED), a micro-light-emitting diode (micro LED) or a quantum dot light-emitting diode (quantum dot LED).

As shown in FIG. 2D, in accordance with some embodiments, a display module 10D includes two adjacent viewing-angle control devices 200 and a display device 100' adjacent to the viewing-angle control device 200. In this embodiment, the display module 10D may not have a backlight module 300, and the display device 100' may be the aforementioned self-luminous display device.

Figure 3:
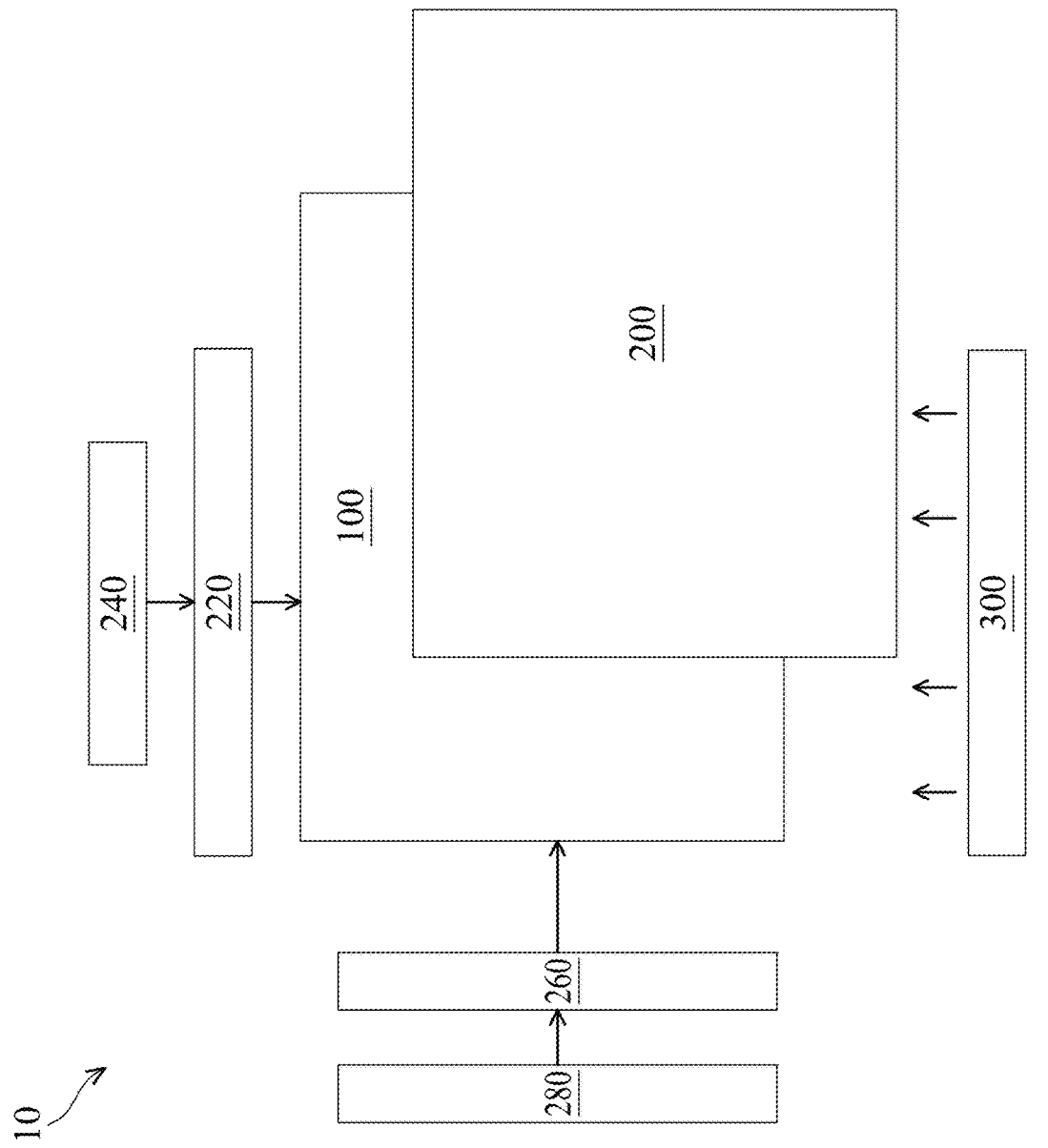
FIG. 3 is a schematic diagram of a display module in accordance with some embodiments of the present disclosure.

Next, please refer to FIG. 3, which is a schematic diagram of the display module 10 in accordance with some embodiments of the present disclosure. It should be understood that FIG. 3 is merely a simple schematic diagram showing the connection relationship of the components of the module 10, and does not represent the actual positional relationship of these components.

As shown in FIG. 3, the display module 10 may include a display device 100, a viewing-angle control device 200 and a backlight module 300. Moreover, the display module 10 may have a data line driving element 220, a gamma correction integrated circuit (Gamma IC) element 240, a gate line driving element 260 and a time controller 280. In accordance with some embodiments, the gamma correction integrated circuit element 240 may be electrically connected to the data line driving element 220 to control the color temperature of the display device 100. Furthermore, in accordance with some embodiments, the time controller 280 may be electrically connected to the gate line driving element 260 and control the timing of the display device 100.

Figure 4A:
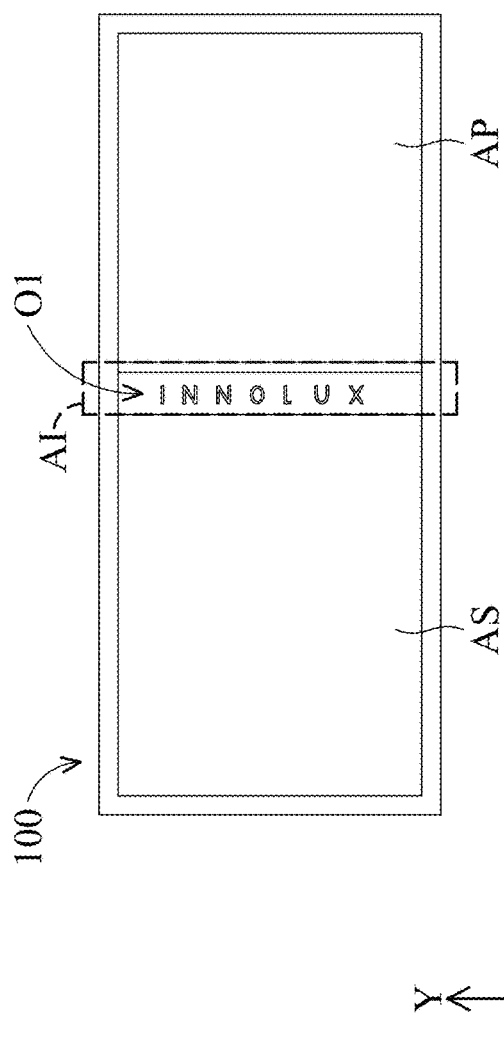
FIG. 4A and FIG. 4B are schematic diagrams of a display device in a display module in accordance with some embodiments of the present disclosure.
Figure 4B:
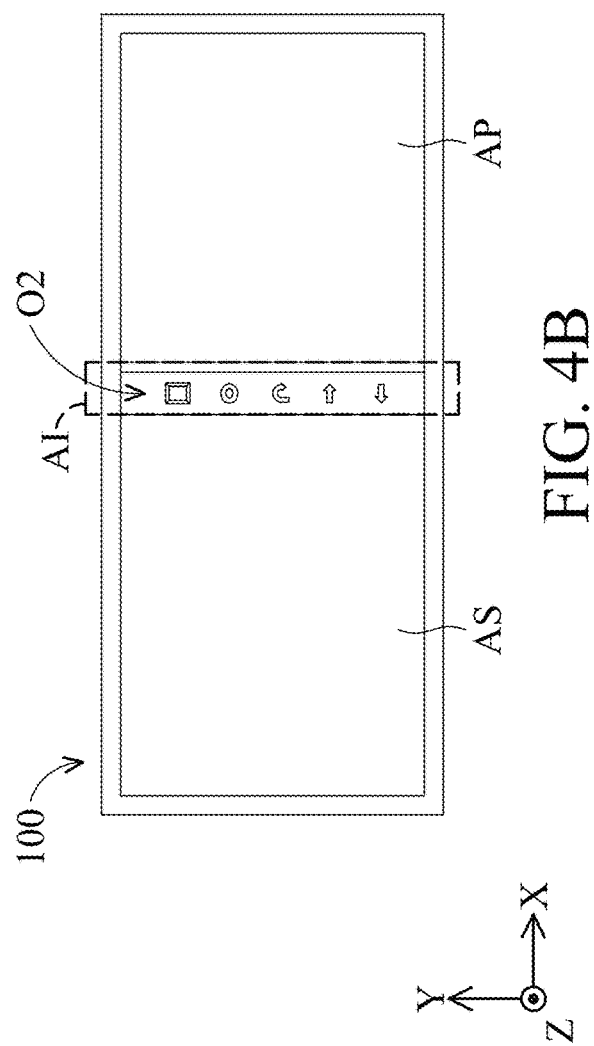

Next, please refer to FIG. 4A and FIG. 4B, which are schematic diagrams of the display device 100 in the display module in accordance with some embodiments of the present disclosure. It should be understood that FIG. 4A and FIG. 4B are simple schematic diagrams of the image of the display device 100 viewed by the user.

As described above, the first viewing-angle control device 200A and the second viewing-angle control device 200B can adjust the light-emitting angle of the display module 10 so that the display module 10 can present the privacy mode and/or the share mode. As shown in FIG. 4A, in accordance with some embodiments, the display device 100 may have a shared display area AS and a privacy display area AP, and the display device 100 has a junction area AI between the shared display area AS and the privacy display area AP. The junction area AI may include an icon O1. Furthermore, in accordance with some embodiments, the junction area AI of the shared display area AS and the privacy display area AP substantially corresponds to the area of the first slit SL1 or the second slit SL2. In other words, the region of the display device 100 overlapping the first slit SL1 or the second slit SL2 may include the icon O1. In accordance with some embodiments, the icon O1 may overlap with distance S (as shown in FIG. 1).

As shown in FIG. 4B, in accordance with some embodiments, the display device 100 may have a shared display area AS and a privacy display area AP, and the display device 100 may include a logo O2 in the junction area AI of the shared display area AS and the privacy display area AP. Furthermore, in accordance with some embodiments, the junction area AI of the shared display area AS and the privacy display area AP substantially corresponds to the region of the first slit SL1 or the second slit SL2. In other words, the region of the display device 100 overlapping the first slit SL1 or the second slit SL2 may include the logo O2. In accordance with some embodiments, the logo O2 may overlap with distance S (as shown in FIG. 1).

It should be noted that the setting of the icon O1 or the logo O2 can modify the junction of different display areas (for example, the shared display area AS and the privacy display area AP) of the display device 100 to improve the discontinuity of the images at the junction.

Figure 5:
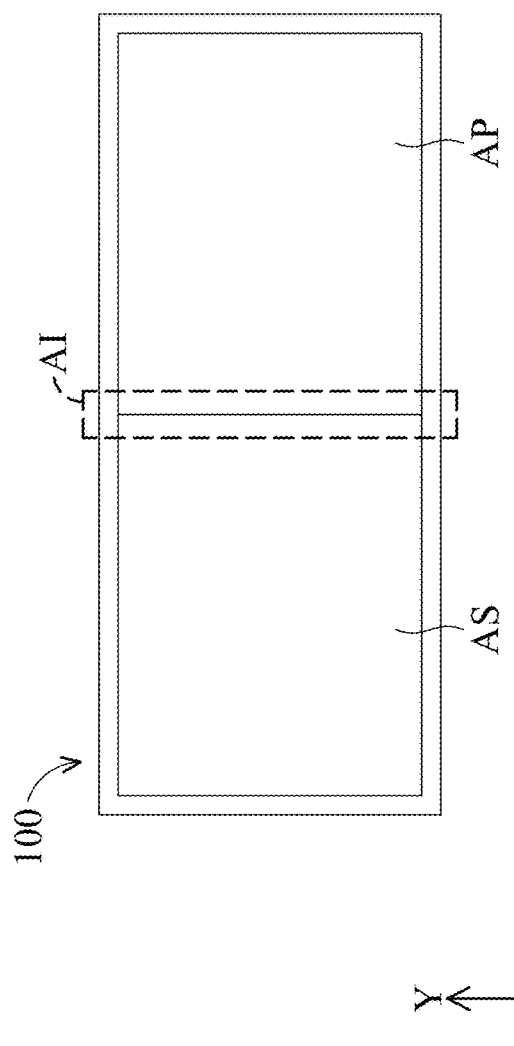
FIG. 5 and FIG. 6 are schematic diagrams of a display device in a display module in accordance with some embodiments of the present disclosure.

Next, please refer to FIG. 5, which is a schematic diagram of the display device 100 in the display module in accordance with some other embodiments of the present disclosure. It should be understood that FIG. 5 is a simple schematic diagram of the image of the display device 100 viewed by the user.

As shown in FIG. 5, when the display device 100 has a shared display area AS and a privacy display area AP, there is a junction area AI between the shared display area AS and the privacy display area AP. Moreover, the brightness of the junction area AI may be lower than the brightness of the shared display area AS and/or the privacy display area AP. Specifically, in accordance with some embodiments, the backlight device 300 of the display module may have an integrated circuit (IC) component (not illustrated), and the IC component may be used to control the brightness of the junction area AI to make its brightness lower than the brightness of the shared display area AS and/or the privacy display area AP. Alternatively, in accordance with some embodiments, the signal provided to the display device 100 can be processed by image processing software to achieve the effect of rendering the image of the junction area AI, thereby making the brightness of the junction area AI lower than that of the shared display area AS and/or the privacy display area AP.

Furthermore, in accordance with some other embodiments, when the display device 100 has a shared display area AS and a privacy display area AP, the color temperature of the junction area AI may be different from the color temperature of the shared display area AS and/or the privacy display area AP. In detail, in accordance with some embodiments, the display device 100 of the display module has a gamma correction integrated circuit (Gamma IC) element 240, and the color temperature (e.g., color complementary rendering) of the junction area AI can be controlled by the gamma correction integrated circuit element 240. Alternatively, in accordance with some embodiments, the signal provided to the display device 100 can also be processed by image processing software to achieve the effect of rendering the image of the junction area AI, thereby making the color temperature of the junction area AI different from the shared display area AS and/or the privacy display area AP. In this way, the poor optical quality of the display module 10 caused by large viewing-angle deviation can be reduced and the optical quality of the display module 10 can be optimized. Color temperature complementary rendering is not limited to the junction area AI. In accordance with some other embodiments, color temperature complementary rendering can also be performed on the areas surrounding the shared display area AS and/or the privacy display area AP. In other words, the color temperature of the surrounding areas of the shared display area AS is different from the color temperature of the middle area. Similarly, the color temperature of the surrounding area and the middle area of the privacy display area AP can also be different, but it is not limited thereto.

It should be noted that the brightness and/or color temperature of the junction area AI can be adjusted by any combination of the above methods, so as to achieve the effect of blurring the junction of different display areas of the display device 100 and improve the discontinuity of the images at the junction.

In addition, in accordance with some embodiments, the display module may further include a sensing device (not illustrated). The sensing device may be coupled to the first viewing-angle control device 200A and the second viewing-angle control device 200B. The sensing device can control the display device 100 so that it can have a shared display area AS and/or a privacy display area AP. Specifically, the switching of the shared display area AS and the privacy display area AP can be automatically controlled by sensing devices such as a vehicle speed sensor, a charge coupled device (CCD), or a visual sensor. In accordance with some embodiments, the user can also directly control the monitor. In accordance with some embodiments, the display module may further include a vehicle control unit (VCU) (not illustrated), and the vehicle control unit may be coupled to the sensing device. That is, the vehicle control unit can control the switching of the shared display area AS and the privacy display area AP.

Figure 6:
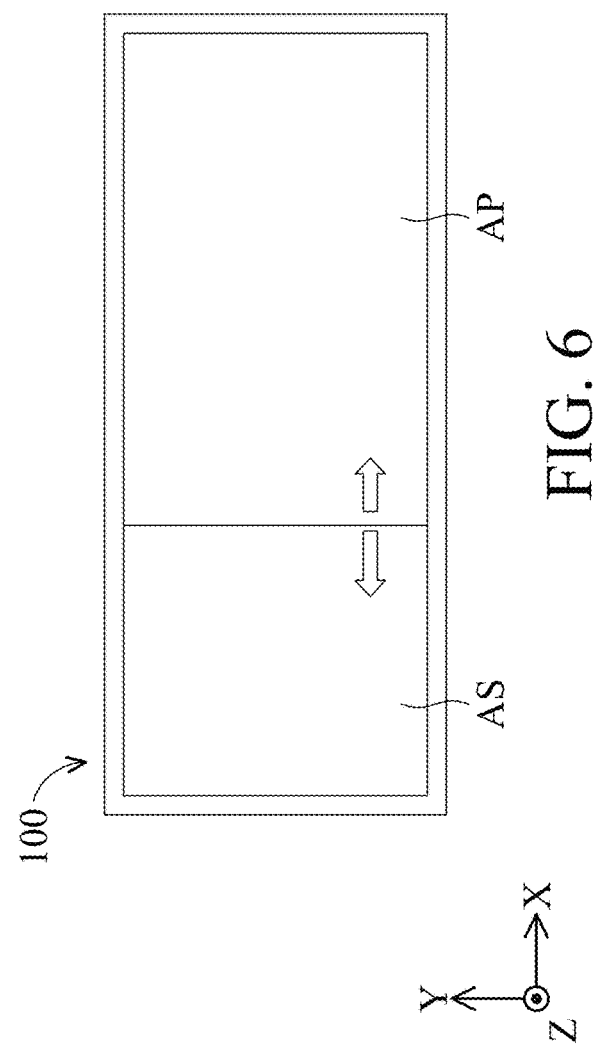

Next, please refer to FIG. 6, which is a schematic diagram of the display device 100 in the display module in accordance with some other embodiments of the present disclosure. It should be understood that FIG. 6 is a simple schematic diagram of the image of the display device 100 viewed by the user.

In accordance with some embodiments, the display device 100 of the display module may have a touch function. For example, the display device 100 may further include a touch electrode, so the size of the shared display area AS and the privacy display area AP can be adjusted by pressing and touching.

Next, please refer to FIG. 7, which is a schematic diagram of some components in the display module in accordance with some embodiments of the present disclosure. Specifically, for clarity of explanation, FIG. 7 only illustrates the display device 100 and the transparent conductive layer 206a of the first viewing-angle control device 200A or the second viewing-angle control device 200B of the display module.

As shown in FIG. 7, in accordance with some embodiments, the display device 100 may have a plurality of first pixel units PX1, a plurality of second pixel units PX2, and a plurality of third pixel units PX3 that emit light of different colors. The first pixel unit PX1, the second pixel unit PX2 and the third pixel unit PX3 may be arranged in a longitudinal strip manner. For example, the first pixel unit PX1, the second pixel unit PX2 and the third pixel unit PX3 may be arranged along a direction DS-1 (for example, the X direction in the drawing) that is perpendicular to a longitudinal direction D206 (for example, the Y direction in the drawing) of the transparent conductive layer 206a. Furthermore, the side 206s-1 of the portion P1 and/or the side 206s-2 of the portion P2 of the transparent conductive layer 206a may be non-linear. For example, as shown in FIG. 7, in accordance with some embodiments, the side 206s-1 of the portion P1 or the side 206s-2 of the portion P2 of the transparent conductive layer 206a may be zigzag-shaped, but it is not limited thereto. In accordance with some embodiments, the side 206s-1 of the portion P1 or the side 206s-2 of the portion P2 of the transparent conductive layer 206a may be arc-shaped, irregular, or another suitable non-linear shaped. It should be noted that with this configuration, the large area of single-color pixel units appearing at the junction of different display areas of the display device 100 can be reduced, the occurrence of color fringes at the junction can be decreased, and thereby improving the discontinuity of the images at the junction.

It should be understood that, in accordance with some embodiments, the aforementioned term "longitudinal direction" may be defined as a direction along or parallel to the long axis of an object. The long axis is defined as the straight line extending lengthwise through the center of the object. For an elongated or elliptical object, the long axis is closest to its greatest longitudinal dimension. For objects that do not have a well-defined long axis, the long axis may represent the long axis of the smallest rectangle that can surround the object.

Furthermore, it should be understood that the embodiment shown in the drawings is based on the example that the display device 100 has three types of pixel units (the first pixel unit PX1, the second pixel unit PX2, and the third pixel unit PX3). In accordance with some embodiments, the first pixel unit PX1, the second pixel unit PX2, and the third pixel unit PX3 may be red pixel unit, green pixel unit, and blue pixel unit respectively. However, in accordance with some different embodiments, the display device 100 may have other suitable numbers and colors of pixel units, and the present disclosure is not limited thereto.

Next, please refer to FIG. 8, which is a schematic diagram of some components in the display module in accordance with some embodiments of the present disclosure. Specifically, for clarity of explanation, FIG. 8 only illustrates the display device 100 and the transparent conductive layer 206a of the first viewing-angle control device 200A or the second viewing-angle control device 200B of the display module.

As shown in FIG. 8, in accordance with some embodiments, the first pixel unit PX1, the second pixel unit PX2 and the third pixel unit PX3 may be arranged in a sub-pixel rendering (SPR) manner. That is, pixel units of the same color are disposed discontinuously. In this embodiment, the side 206s-1 of the portion P1 or the side 206s-2 of the portion P2 of the transparent conductive layer 206a may be linear (as shown in FIG. 8) or non-linear. This configuration can also reduce the large area of single-color pixel units appearing at the junction of different display areas of the display device 100, reduce the occurrence of color fringes at the junction, and thereby improve the discontinuity of the images at the junction.

Next, please refer to FIG. 9, which is a schematic diagram of some components in the display module in accordance with some embodiments of the present disclosure. Specifically, for clarity of explanation, FIG. 9 only illustrates the display device 100 and the transparent conductive layer 206a of the first viewing-angle control device 200A or the second viewing-angle control device 200B of the display module.

As shown in FIG. 9, in accordance with some embodiments, the first pixel unit PX1, the second pixel unit PX2 and the third pixel unit PX3 may be arranged in a horizontal stripe manner. For example, the first pixel unit PX1, the second pixel unit PX2 and the third pixel unit PX3 may be arranged in a direction DS-2 (for example, the Y direction in the drawing) parallel to the longitudinal direction D206 of the transparent conductive layer 206a. In this embodiment, the side 206s-1 of the portion P1 or the side 206s-2 of the portion P2 of the transparent conductive layer 206a may be linear (as shown in FIG. 9) or non-linear. This configuration can also reduce the large area of single-color pixel units appearing at the junction of different display areas of the display device 100, reduce the occurrence of color fringes at the junction, and thereby improve the discontinuity of the images at the junction.

Figure 10:
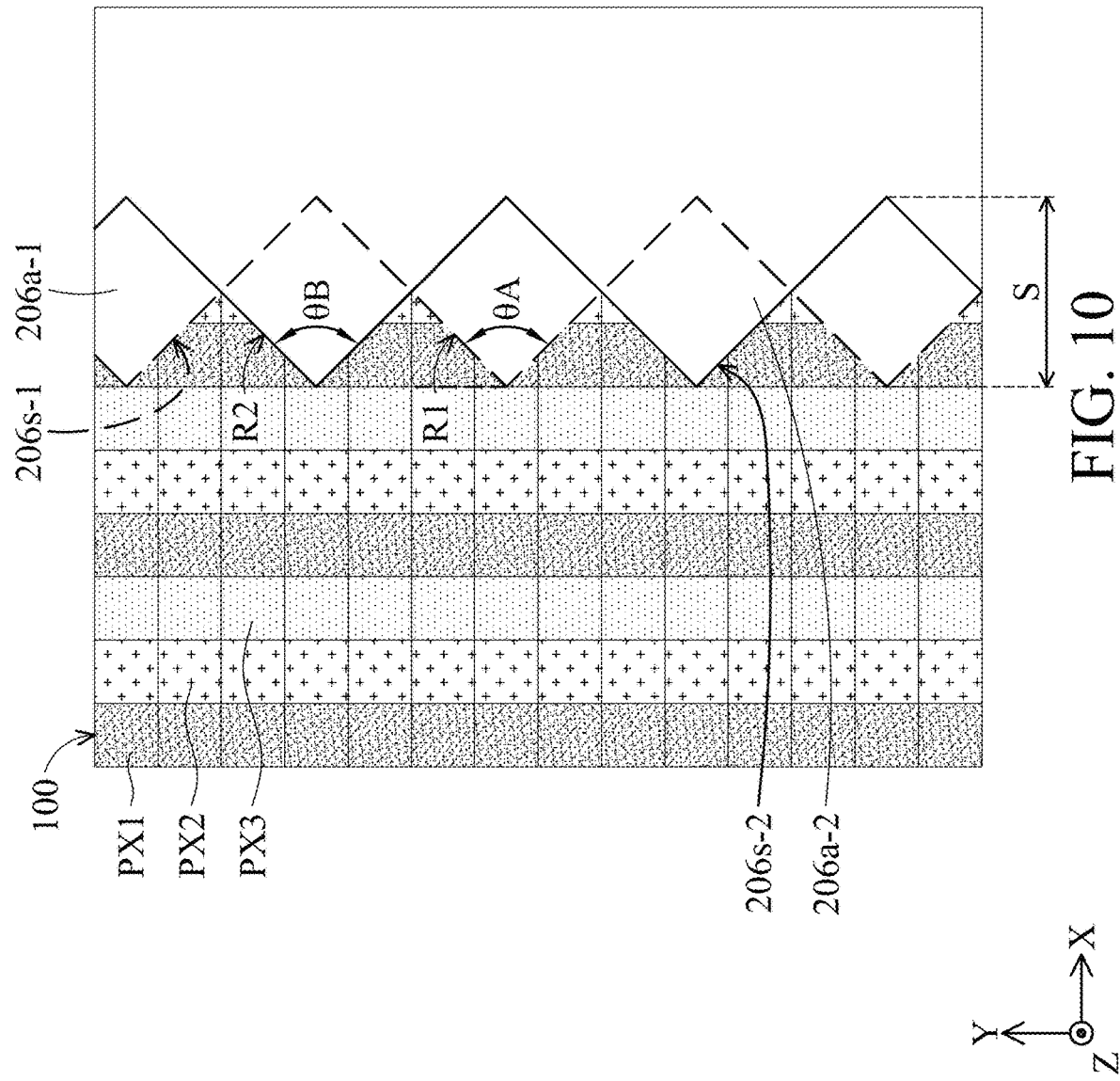

Next, please refer to FIG. 10, which is a schematic diagram of some components in the display module in accordance with some embodiments of the present disclosure. Specifically, for clarity of explanation, FIG. 10 only illustrates the display device 100 and the transparent conductive layers 206a of the first viewing-angle control device 200A and the second viewing-angle control device 200B (labeled as 206a-1 and 206a-2, respectively, for convenience of explanation) of the display module.

As shown in FIG. 10, in accordance with some embodiments, the side 206s-1 of the transparent conductive layer 206a-1 of the first viewing-angle control device 200A and the side 206s-2 of the transparent conductive layer 206a-2 of the second viewing-angle control device 200B can both be non-linear, and the transparent conductive layer 206a-1 and the transparent conductive layer 206a-2 can be offset so that the side 206s-1 and the side 206s-2 are separated by a distance S. Furthermore, the side 206s-1 of the transparent conductive layer 206a-1 may have a protruding portion R1 (for example, a protruding portion of the zigzag), and the protruding portion R1 may have an included angle θA. The side 206s-2 of the transparent conductive layer 206a-2 may have a protruding portion R2 (for example, a protruding portion of the zigzag), and the protruding portion R2 may have an included angle θB. The included angle θA may be substantially equal to the included angle θB. With this configuration, it can reduce the large area of single-color pixel units appearing at the junction of different display areas of the display device 100, reduce the occurrence of color fringes and overlapping images at the junction, and thereby improve the discontinuity of the images at the junction.

Figure 11:
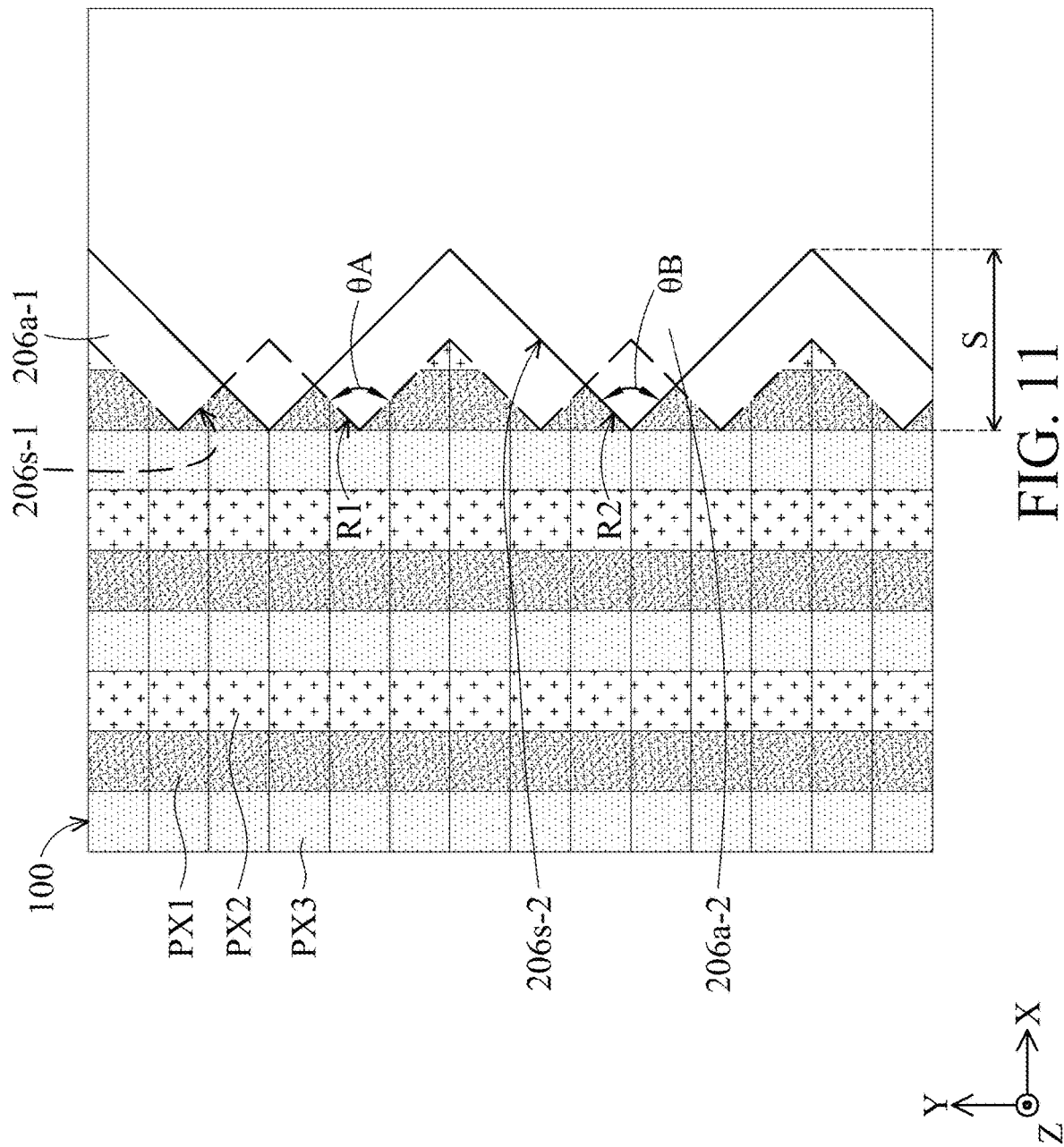

Please refer to FIG. 11, which is a schematic diagram of some components in the display module in accordance with some embodiments of the present disclosure. Specifically, for clarity of explanation, FIG. 11 only illustrates the display device 100 and the transparent conductive layers 206a of the first viewing-angle control device 200A and the second viewing-angle control device 200B (labeled as 206a-1 and 206a-2, respectively, for convenience of explanation) of the display module.

As shown in FIG. 11, in accordance with some embodiments, the side 206s-1 of the transparent conductive layer 206a-1 of the first viewing-angle control device 200A and the side 206s-2 of the transparent conductive layer 206a-2 of the second viewing-angle control device 200B can both be non-linear, and the transparent conductive layer 206a-1 and the transparent conductive layer 206a-2 can be offset so that the side 206s-1 and the side 206s-2 are separated by a distance S. Furthermore, in this embodiment, the side 206s-1 of the transparent conductive layer 206a-1 and the side 206s-2 of the transparent conductive layer 206a-2 may have different shapes. Specifically, the protruding portion R1 of the side 206s-1 of the transparent conductive layer 206a-1 may have an included angle θA, the protruding portion R2 of the side 206s-2 of the transparent conductive layer 206a-2 may have an included angle θB, and the angle θA may be different from the included angle θB. For example, the included angle θA may be greater than the included angle θB. With this configuration, it can reduce the large area of single-color pixel units appearing at the junction of different display areas of the display device 100, reduce the occurrence of color fringes and overlapping images at the junction, and thereby improve the discontinuity of the images at the junction.

Figure 12:
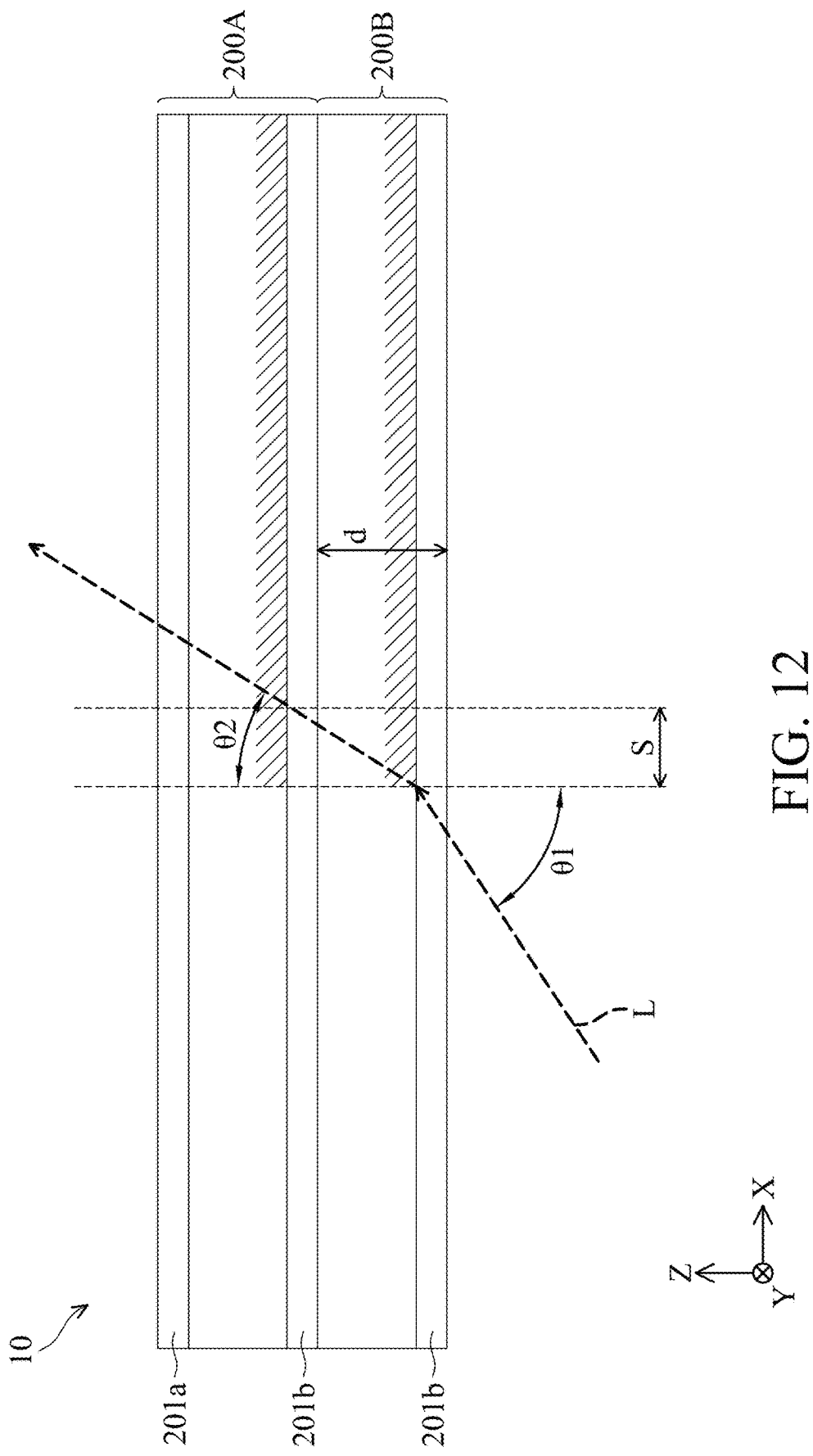
FIG. 12 is a schematic diagram of light incident on a viewing-angle control device in a display module in accordance with some embodiments of the present disclosure.

Next, please refer to FIG. 12, which is a schematic diagram of light incident on the viewing-angle control device in the display module in accordance with some embodiments of the present disclosure. Specifically, FIG. 12 illustrates the refraction of light L in the first viewing-angle control device 200A and the second viewing-angle control device 200B of the display module 10. It should be understood that, for clear explanation, FIG. 12 only illustrates the first viewing-angle control device 200A, the second viewing-angle control device 200B and the polarizing layer 201a and polarizing layer 201b included therein, and the oblique lines in the drawing represent indicate areas of privacy display mode.

As shown in FIG. 12, in accordance with some embodiments, the light L enters the second viewing-angle control device 200B at an incident angle θ1 and generates a refraction angle θ2. The second viewing-angle control device 200B has a thickness d. In this case, the distance S between the side 206s-1 of the portion P1 (as shown in FIG. 1) and the side 206s-2 of the portion P2 (as shown in FIG. 1) of the transparent conductive layer 206a is Tan (θ2)*d. In accordance with some embodiments, the incident angle θ1 may be between 30 degrees and 65 degrees (30 degrees≤incident angle θ1≤65 degrees), for example, 35 degrees, 40 degrees, 45 degrees, 50 degrees, 55 degrees or 60 degrees, but it is not limited thereto. In accordance with some embodiments, the refraction angle θ2 may be the refraction angle generated by the light L incident from air (refractive index n is 1) to glass (refractive index n is about 1.5). The aforementioned incident angle θ1 and refraction angle θ2 are both angles relative to the normal direction of the substrate 202a or the substrate 202 b (for example, the Z direction in the drawing). Furthermore, the thickness d of the second viewing-angle control device 200B may be defined as the distance between the polarizing layer 201b of the second viewing-angle control device 200B and the polarizing layer 201b of the first viewing-angle control device 200A in the normal direction of the substrate 202a or the substrate 202b (for example, the Z direction in the drawing). As described above, in accordance with some embodiments, the distance S may be between 1 mm and 50 mm (1 mm≤distance S≤50 mm), or between 5 mm and 45 mm, such as 10 mm, 15 mm, 20 mm, 25 mm, 30 mm, 35 mm or 40 mm. In accordance with some embodiments, the distance S may be Tan (θ2)*d±25 mm, Tan (θ2)*d±20 mm, Tan (θ2)*d=10 mm, to reduce light leakage or image ghosting caused by errors, which may result in a reduction in the optical quality of the display module.

Figure 13:
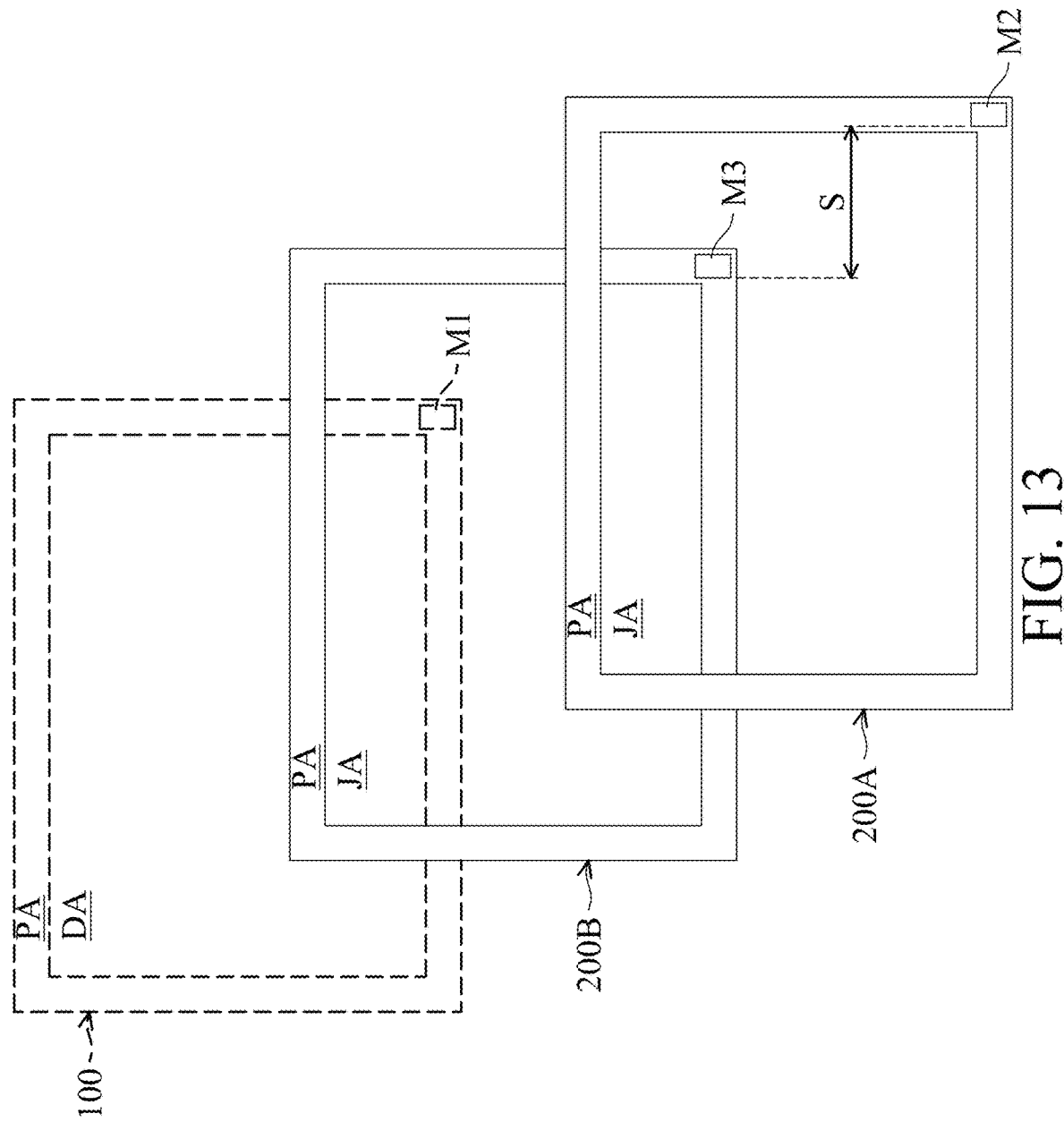
FIG. 13 is a schematic diagram of a display module in accordance with some embodiments of the present disclosure.

Next, please refer to FIG. 13, which is a schematic diagram of a display module in accordance with some embodiments of the present disclosure. It should be understood that FIG. 13 is merely used to illustrate the alignment manner between the display device 100, the first viewing-angle control device 200A and the second viewing-angle control device 200B, and does not represent the actual positional relationship of these components.

As shown in FIG. 13, the display device 100 may have a display area DA and a peripheral area PA surrounding the display area DA, and the display device 100 may include a first alignment mark M1 disposed in the peripheral area PA. The first viewing-angle control device 200A may have a viewing-angle adjustment area JA and a peripheral area PA surrounding the viewing-angle adjustment area JA, and the first viewing-angle control device 200A may include a second alignment mark M2 disposed in the peripheral area PA. Furthermore, the second viewing-angle control device 200B may have a viewing-angle adjustment area JA and a peripheral area PA surrounding the viewing-angle adjustment area JA, and the second viewing-angle control device 200B may include a third alignment mark M3 disposed in the peripheral area PA. In accordance with some embodiments, the viewing-angle adjustment area JA of the second viewing-angle control device 200B may substantially correspond to the display area DA of the display device 100. In accordance with some embodiments, the transparent conductive layers 206a of the first viewing-angle control device 200A and the second viewing-angle control device 200B are not offset (that is, the side 206s-1 and the side 206s-2 substantially overlap). In this case, the first alignment mark M1 of the display device 100 may overlap the third alignment mark M3 of the second viewing-angle control device 200B, and the second alignment mark M2 of the first viewing-angle control device 200A and the third alignment mark M3 of the second viewing-angle control device 200B may be separated by a distance S'. The distance S' is substantially the same as the offset distance S (as shown in FIG. 1) between the side 206s-1 and the side 206s-2 of the transparent conductive layers 206a, for example, it may be equal to Tan (θ2)*d. In other words, in accordance with some embodiments, the transparent conductive layers 206a of the first viewing-angle control device 200A and the second viewing-angle control device 200B of the display module are not disposed in an offset (misaligned) manner, but the overall structures of the first-viewing-angle control device 200A and the second viewing-angle control device 200B are disposed in an offset (misaligned) such that the side 206s-1 and the side 206s-2 of the transparent conductive layers 206a are separated by a distance S.

However, in accordance with some embodiments, the transparent conductive layers 206a of the first viewing-angle control device 200A and the second viewing-angle control device 200B of the display module themselves have been offset (as shown in FIG. 1), and the side 206s-1 and the side 206s-2 of the transparent conductive layers 206a are separated by a distance S. In this case, the first alignment mark M1 of the display device 100, the third alignment mark M3 of the second viewing-angle control device 200B and the second alignment mark M2 of the first viewing-angle control device 200A may overlap to complete the alignment.

To summarize the above, according to the embodiments of the present disclosure, the display module provided includes the display device and viewing-angle control devices that are configured in a specific manner, which can be zone-controlled to display the same or different modes (for example, a privacy mode and a share mode). In this way, the borderless requirement can be achieved, and the discontinuity of the images at the junction of areas of different display modes can be reduced. Therefore, the visual taste can be improved, and the ghosting caused by side viewing angles can be reduced.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Thus, the appended claims are intended to include within their scope such processes, machines, manufacture, compositions of matter, means, methods or steps. Moreover, each claim constitutes an individual embodiment, and the claimed scope of the present disclosure includes the combinations of the claims and embodiments. The scope of protection of the present disclosure is subject to the definition of the scope of the appended claims. Any embodiment or claim of the present disclosure does not need to meet all the purposes, advantages, and features disclosed in the present disclosure.

What is claimed is:

1. A display module, comprising:
   a display device;
   a first viewing-angle control device adjacent to the display device, comprising:
   a first substrate and a second substrate;
   a first liquid-crystal layer disposed between the first substrate and the second substrate; and
   a first transparent conductive layer disposed between the first substrate and the second substrate and comprising a first portion;
   a second viewing-angle control device disposed on the first viewing-angle control device, comprising:
   a third substrate and a fourth substrate;
   a second liquid-crystal layer disposed between the third substrate and the fourth substrate; and
   a second transparent conductive layer disposed between the third substrate and the fourth substrate and comprising a second portion, wherein the second portion overlaps the first portion,
   wherein in a cross-sectional view, a side of the first portion of the first transparent conductive layer is separated from a side of the second portion of the second transparent conductive layer by a first distance.

2. The display module as claimed in claim 1, wherein the first distance is between 1 mm and 50 mm.

3. The display module as claimed in claim 1, wherein the first transparent conductive layer has a first slit, and the second transparent conductive layer has a second slit, wherein in the cross-sectional view, the first slit and the second slit do not overlap in a normal direction of the first substrate.

4. The display module as claimed in claim 3, wherein in a top view, the display device has an area overlapping the first slit or the second slit, and the area includes an icon or a logo.

5. The display module as claimed in claim 3, wherein a width of the first slit is between 4 micrometers and 10 micrometers, and a width of the second slit is between 4 micrometers and 10 micrometers.

6. The display module as claimed in claim 1, wherein a width of the first portion of the first transparent conductive layer is greater than a width of the second portion of the second transparent conductive layer.

7. The display module as claimed in claim 6, wherein the first transparent conductive layer further comprises a third portion adjacent to the first portion, and the second transparent conductive layer further comprises a fourth portion adjacent to the second portion, and a width of the third portion is smaller than a width of the fourth portion.

8. The display module as claimed in claim 1, wherein light enters the second viewing-angle control device at an incident angle $\theta1$ and generates a refraction angle $\theta2$, the second viewing-angle control device has a thickness d, the third viewing-angle control device has a thickness d, and the first distance between the side of the first portion and the side of the second portion is Tan $(\theta2)*d$.

9. The display module as claimed in claim 1, wherein the display device has a plurality of first pixel units, a plurality of second pixel units and a plurality of third pixel units emitting light of different colors, the plurality of first pixel units, the plurality of second pixel units and the plurality of third pixel units are arranged in a sub-pixel rendering (SPR) manner, and the first transparent conductive layer of the first viewing-angle control device overlaps the plurality of first pixel units, the plurality of second pixel units and the plurality of third pixel units, and the side of the first transparent conductive layer is linear.

10. The display module as claimed in claim 1, wherein the display device has a plurality of first pixel units, a plurality of second pixel units and a plurality of third pixel units emitting light of different colors, and the plurality of first pixel units, the plurality of second pixel units and the plurality of third pixel units are arranged in a direction parallel to a longitudinal direction of the first transparent conductive layer, and the first transparent conductive layer of the first viewing-angle control device overlaps the plurality of first pixel units, the plurality of second pixel units and the plurality of third pixel units, and the side of the first transparent conductive layer is linear.

11. The display module as claimed in claim 1, wherein the display device has a plurality of first pixel units, a plurality of second pixel units and a plurality of third pixel units emitting light of different colors, and the plurality of first pixel units, the plurality of second pixel units and the plurality of third pixel units are arranged in a direction perpendicular to a longitudinal direction of the first transparent conductive layer, wherein the side of the first portion of the first transparent conductive layer and/or the side of the second portion of the second transparent conductive layer are non-linear.

12. The display module as claimed in claim 11, wherein the side of the first portion of the first transparent conductive layer and/or the side of the second portion of the second transparent conductive layer is zigzag-shaped.

13. The display module as claimed in claim 1, wherein the display device has a display area and a first peripheral area surrounding the display area, the display device has a first alignment mark disposed in the peripheral area, the first viewing-angle control device has a first viewing-angle adjustment area and a second peripheral area surrounding the first viewing-angle adjustment area, the first viewing-angle control device has a second alignment mark disposed in the second peripheral area, the second viewing-angle control device has a second viewing-angle adjustment area and a third peripheral area surrounding the second viewing-angle adjustment area, and the second viewing-angle control device has a third alignment mark disposed in the third peripheral area.

14. The electronic device as claimed in claim 13, wherein the first alignment mark overlaps the third alignment mark, the second alignment mark and the third alignment mark are separated by a second distance, and the second distance is the same as the first distance.

15. The electronic device as claimed in claim 1, wherein the first viewing-angle control device and the second viewing-angle control device adjust the light emission angle of the display device so that the display device has a shared display area and/or a privacy display area.

16. The display module as claimed in claim 1, wherein when the display device has a shared display area and a privacy display area, there is a junction area between the shared display area and the privacy display area, and the brightness of the junction area is lower than the brightness of the shared display area and/or the privacy display area.

17. The display module of claim 16, further comprising a backlight device adjacent to the first viewing-angle control device, wherein the backlight device has an integrated circuit (IC) component, and the integrated circuit component controls the brightness of the junction area.

18. The electronic device as claimed in claim 15, wherein when the display device has the shared display area and the privacy display area, there is a junction area between the shared display area and the privacy display area, and the color temperature of the junction area is different from the color temperature of the shared display area and/or the privacy display area.

19. The electronic device as claimed in claim 18, wherein the display device has a gamma correction integrated circuit (Gamma IC) element, and the gamma correction IC element controls the color temperature of the junction area.

20. The electronic device as claimed in claim 1, further comprising a sensing device coupled to the first viewing-angle control device and the second viewing-angle control device, wherein the sensing device controls the display device to have a shared display area and/or an a privacy display area.

* * * * *